US006832466B2

(12) United States Patent
Freiberg et al.

(10) Patent No.: US 6,832,466 B2
(45) Date of Patent: Dec. 21, 2004

(54) BRUSH CUTTER EMERGENCY STOP SYSTEM

(75) Inventors: Scott E. Freiberg, Champlin, MN (US); Roger E. Roy, Champlin, MN (US)

(73) Assignee: Cross Tech Manufacturing, Inc., Cross Lake, MN (US)

( * ) Notice: Subject to any disclaimer, the term of this patent is extended or adjusted under 35 U.S.C. 154(b) by 0 days.

(21) Appl. No.: 10/247,779

(22) Filed: Sep. 19, 2002

(65) Prior Publication Data

US 2003/0074873 A1 Apr. 24, 2003

Related U.S. Application Data

(60) Provisional application No. 60/323,239, filed on Sep. 19, 2001.

(51) Int. Cl.$^7$ .............................................. A01D 75/18
(52) U.S. Cl. ...................................................... 56/10.4
(58) Field of Search ....................... 56/10.2 K, 10.2 D, 56/10.2 E, 10.5, 11.9, 7, 10.8, 11.3, 11.7, 15.9, 16.4

(56) References Cited

U.S. PATENT DOCUMENTS

| 3,369,350 | A | * | 2/1968 | Rogers et al. | ............... 56/11.9 |
| 4,445,312 | A | * | 5/1984 | Cartner | ...................... 56/15.5 |
| 5,005,344 | A | * | 4/1991 | McCracken | ................. 56/14.7 |
| 5,435,117 | A | | 7/1995 | Eggena | .................... 56/10.2 D |
| 5,706,638 | A | | 1/1998 | Kinder et al. | ............ 56/10.2 E |

* cited by examiner

Primary Examiner—Robert E Pezzuto
(74) Attorney, Agent, or Firm—Nawrocki, Rooney & Sivertson, P.A.

(57) ABSTRACT

A safety apparatus for a tool driven by a motor at high speeds is provided, more particularly, an apparatus including a housing moveable over the ground surface for mounting the tool, and a ground engaging member disposed to follow the ground surface as the housing moves over same, the ground engaging member being moveable relative to the housing. The apparatus further includes a sensor for measuring the relative distance between the housing and ground engaging member, and apparatus for selectively stopping the motor upon the distance between the ground engaging member and the housing exceeding a predetermined distance.

15 Claims, 6 Drawing Sheets

BRUSH CUTTER EMERGENCY STOP SYSTEM

CROSS-REFERENCE TO RELATED APPLICATIONS

This is a regular application filed under 35 U.S.C. § 111(a) claiming priority, under 35 U.S.C. § 119(e)(1), of provisional application Ser. No. 60/323,239, previously filed Sep. 19, 2001 under 35 U.S.C. § 111(b).

FIELD OF THE INVENTION

The present invention relates generally to the field of cutting and mulching equipment. More specifically, the present invention relates to improved operator safety in the use of rotary brush cutters and mulchers.

BACKGROUND OF THE INVENTION

Cutting and mulching equipment is often used to cut away and/or clear brush including tall grass, plants, weeds, shrubs, wood chips, branches and the like. A common method for clearing brush involves a rotary brush cutter. Such a cutter has a blade that rotates in a plane generally parallel to the ground such that it generally uniformly cuts the brush.

A brush cutter may be mounted on a tractor loader (Bobcat) or other such surface loading machinery or equipment. The brush cutter is mounted generally on the front of a machine or cab such that the brush cutter clears a path for the operator and equipment on which the brush cutter is mounted.

A brush cutter may pose a risk of injury to an operator. A common problem occurs where an object is thrown from the cutting area of the brush cutter. The object may be a twig, a rock, or any other object that may pose a risk to an operator. There is a potential that such an object could hit an operator and cause injury. This problem is more pronounced when the rear portion of the brush cutter is raised off the ground with respect to the front portion, the rear portion being the portion nearest the operator.

It is thus preferable that the brush cutter have a protective mechanism, such as an automatic shut-down mechanism, for when the brush cutter is raised to a dangerous height off of the ground.

One mechanism in the prior art involves a set of rollers positioned at a rear portion of a brush cutter. These rollers are heavy so that they maintain contact with the ground. If the brush cutter is raised to a predetermined height, the rollers will drop down with respect to the brush cutter housing and cause the automatic shut-off mechanism to be actuated. A problem with this apparatus is that the rollers may cause an unnecessary shut-off if the brush cutter travels over a hole or crevice area that causes the rollers to drop down to the predetermined shut-off distance.

A similar problem can occur when the brush cutter travels over a log. The rollers will drop down once they have rolled over the log, thus unnecessarily implementing operation of the shut-off mechanism.

Another problem with this mechanism is that it adds significant weight to the brush cutter, thus limiting the vast majority of cabs that can carry the weight of the shut-off mechanism.

Another mechanism in the prior art involves the use of an apparatus wherein a shut-off mechanism is initiated based on the difference between the height of the brush cutter with respect to the height of a cab. This apparatus includes a chain having a first end bolted to the brush cutter and a second end secured to a chassis of the cab, to thus limit the height to which the brush cutter can be lifted off of the ground with respect to the cab. A problem with this mechanism is that the brush cutter may be located over an inclined surface with respect to the cab, thus unnecessarily initiating the shut-off mechanism.

Another problem with these prior art mechanisms is that they lack shut-off devices that extend along the entire length of the side of the brush cutter to prevent debris from escaping through the sides of the brush cutter. Also, these mechanisms can become caught on the ground and other debris during operation, requiring the operator to shut down the machine and clean them off. Another problem with these mechanisms is that they are independent of the electrical mechanism, or motor, that runs the brush cutter. Thus, the safety mechanisms may be removed from the brush cutter without affecting operation. For example, the chain or rollers may be removed from the brush cutter and the brush cutter will still be able to operate, thus making the effectiveness of the safety mechanism moot.

The present invention provides for an improved brush cutter that addresses these shortcomings.

SUMMARY OF THE INVENTION

The present invention relates to improvements in safety features for a brush cutter. The invention includes a protection barrier on the sides of a brush cutter such that objects are prevented from being impelled from the brush cutter toward the operator as the brush cutter passes over the objects. The present invention further includes an emergency stop system, wherein the brush cutter is automatically shut off when the rear portion of the brush cutter is raised to a dangerous height off the ground.

The brush cutter has a back end that is mounted to a drive vehicle, a front end opposite the back end, and two sides. The protective barrier comprises a side panel positioned outwardly of the sides of the brush cutter so as to prevent objects over which the brush cutter passes from being impelled out the sides of the equipment. Each side panel has a front end in the direction of the front end of the brush cutter and a back end in the direction of the back end of the brush cutter. The side panel front end has a hole proximate a hub, and the side panel back end has a slot extending generally vertically or vertically but slightly arcuately. The front end of the brush cutter structure has a pivot shaft that extends through the hub of the side panel. The side panel is able to pivot about the pivot shaft such that the back end of the side panel can pivot upwardly or downwardly with respect to the pivot shaft. The back end of the brush cutter structure has a slot rider that extends through the slot in the side panel. Thus, the side panel may pivot upwardly until the bottom of the slot engages the rider, and the side panel may pivot downwardly until the top of the slot engages the rider.

In operation, if the rear portion of the brush cutter becomes elevated, the back end of the side panel will pivot downwardly relatively. The side panel then prevents objects from being impelled out the side of the brush cutter, wherein the bottom portion of the side panel extends below the bottom of the brush cutter structure. As the rear portion of the brush cutter is leveled, the back end of the side panel will pivot upwardly relatively.

The emergency stop feature is achieved by employment of a system that shuts off the brush cutter motor when the rear portion of the brush cutter structure is elevated beyond a predetermined height. A hydraulic switch is employed such that, when the rear portion of the brush cutter motor is elevated, the hydraulic switch is depressed causing the motor to shut off.

An embodiment of the emergency stop system comprises a hydraulic cylinder secured to the brush cutter structure. The cylinder has a piston end extending toward the back of the brush cutter. The piston end is secured to a pivoting elbow. The pivoting elbow has a first joint pivoting about the piston end, a second joint pivoting about a lower portion of the brush cutter structure, and a third joint pivoting about the side panel.

The arm has a first joint that is connected to the third joint of the elbow and is able to pivot at that joint. The arm has a second joint that is connected to a middle portion of the side plate.

The hydraulic piston acts to force the side plate downwardly. The downward force is supplied by the piston to the first joint of the elbow and interacts with the arm to force the side plate downwardly.

A shut-off valve is positioned adjacent the back of the elbow portion of the pivoting elbow. The shut-off valve has a shaft extending therefrom toward the side panel. A yoke extends from the shaft. A pin extending from the side panel is able to engage the yoke to initiate the shut-off valve by rotating the shaft. A pin is set at a predetermined position on the side panel such that the shut-off valve is actuated only when the side panel moves downwardly a predetermined distance with respect to the housing.

The shut off height and shut off time are adjustable. Adjusting the shut off time may be beneficial to allowing the operator to raise the rotary brush cutter off the ground for a short time without having it shut off. Also, once the motor is shut off, the operator may not turn it on again until the brush cutter has been lowered to the ground and the hydraulic flow has been reversed to reset the system.

DETAILED DESCRIPTION OF THE PREFERRED EMBODIMENTS

Figure 1:
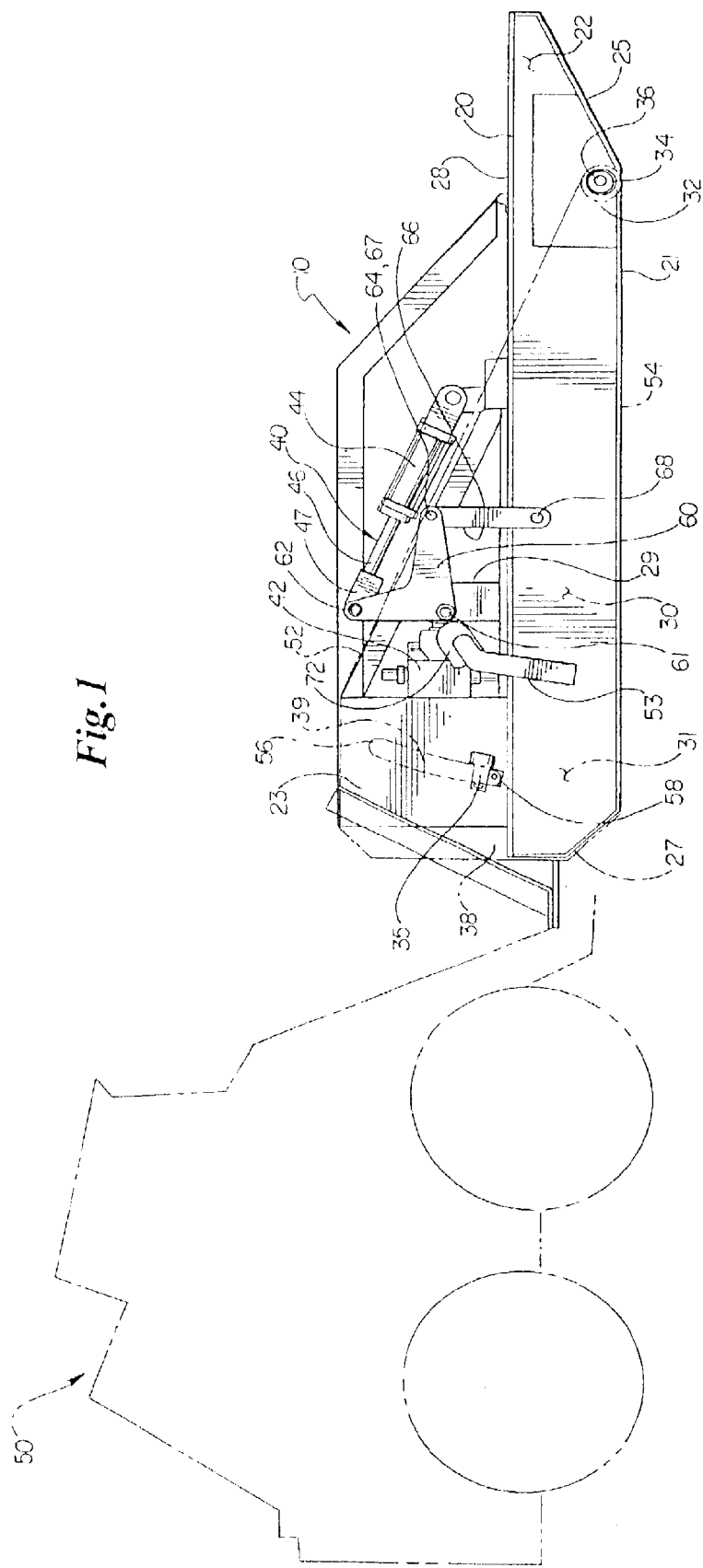
FIG. 1 is a side view of the present invention in a first configuration.
Figure 2:
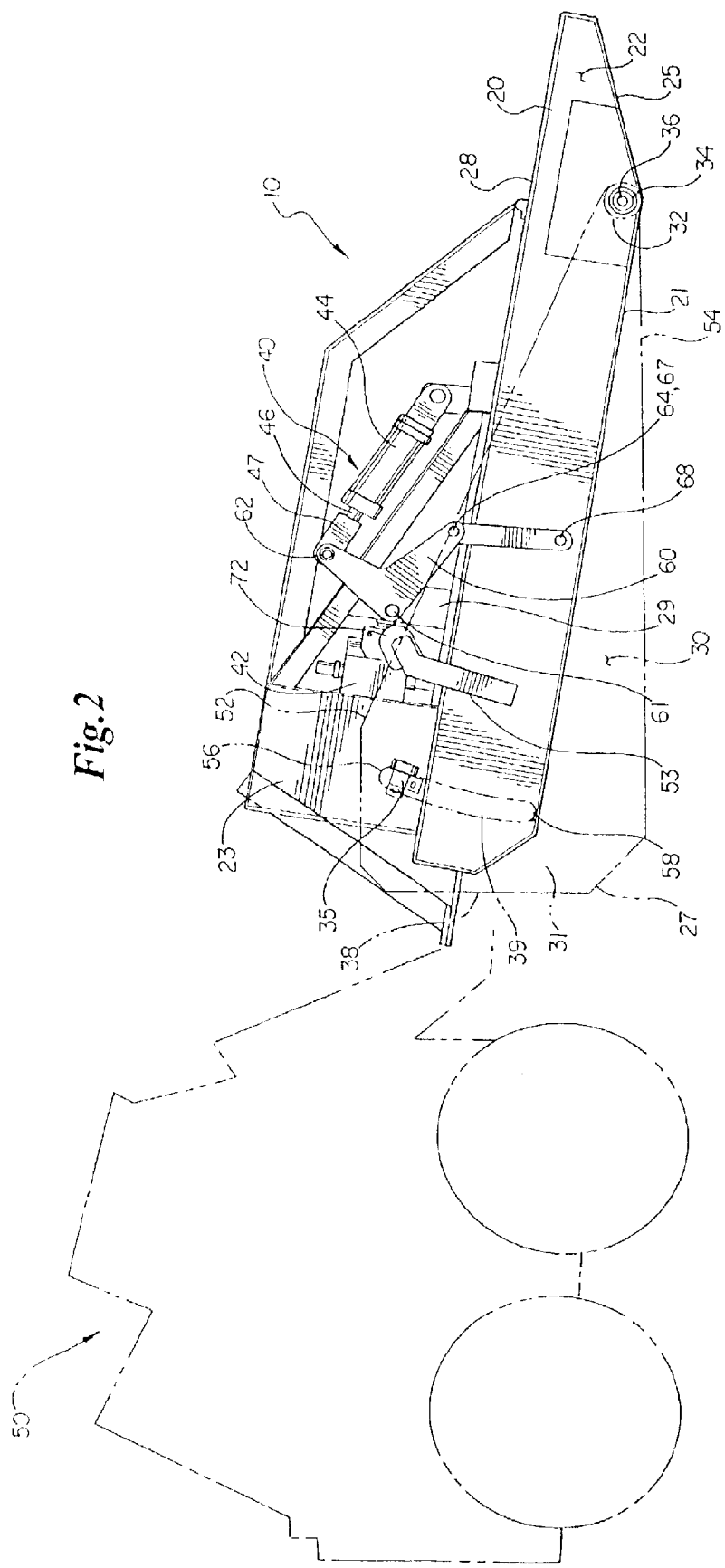
FIG. 2 is a side view of the invention from FIG. 1 in a second configuration.
Figure 3:
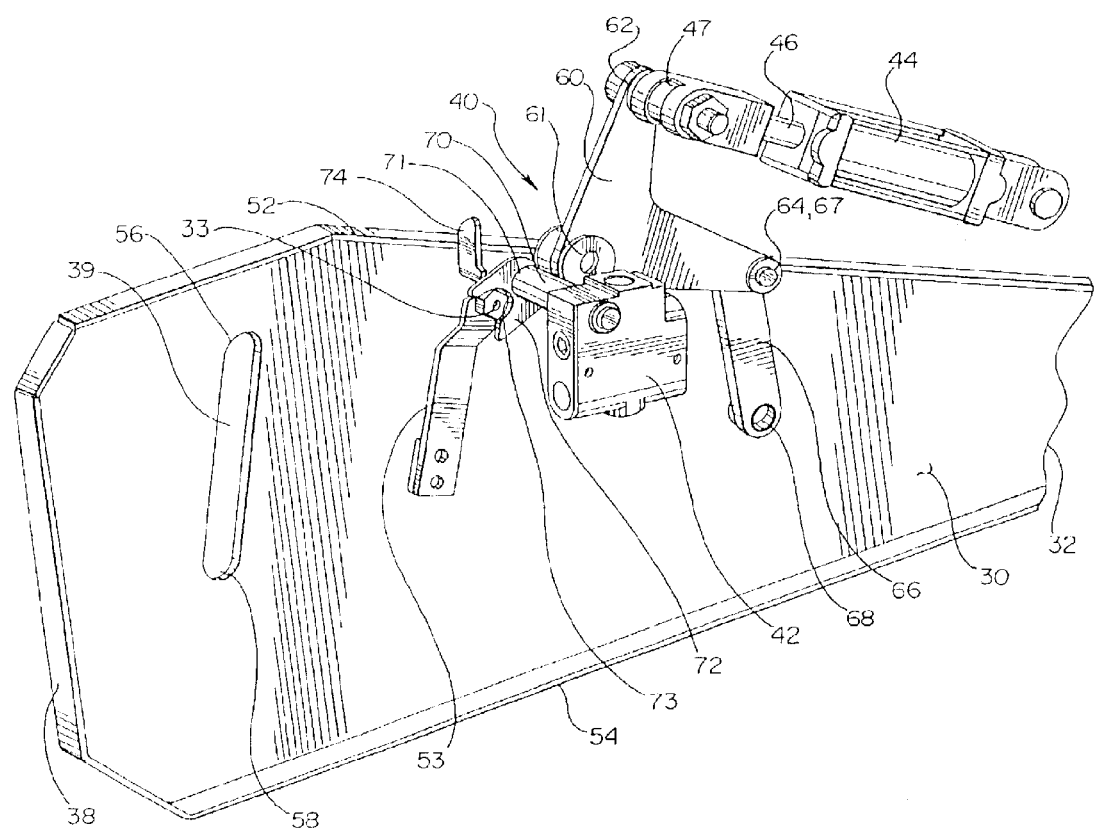
FIG. 3 is a perspective view of the present invention with some parts cut away.
Figure 4:
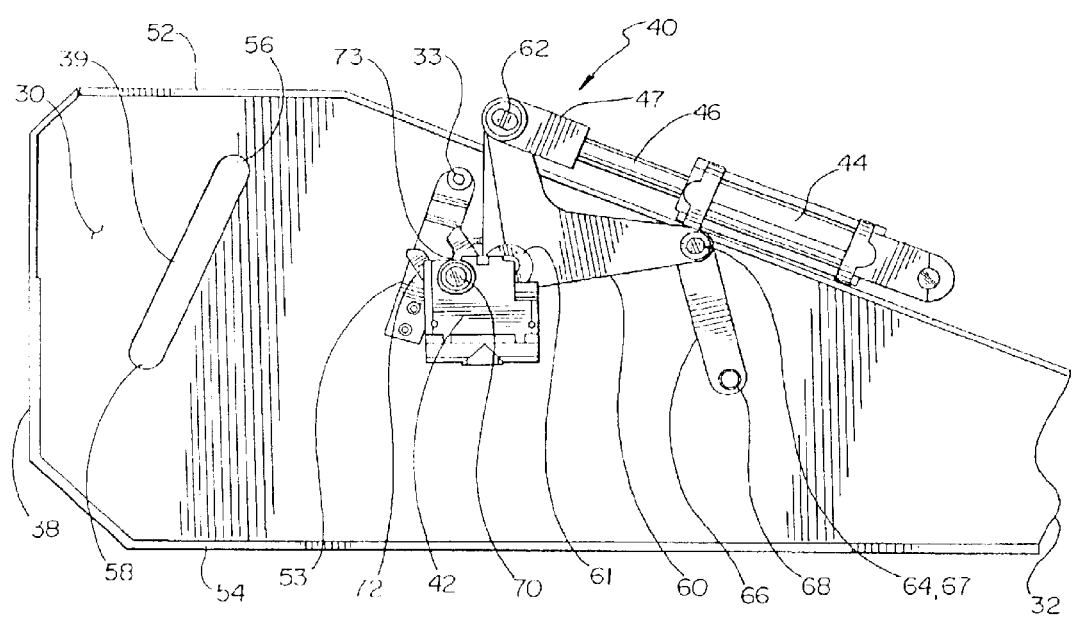
FIG. 4 is a side view of the present invention in the first configuration with some parts cut away.
Figure 5:
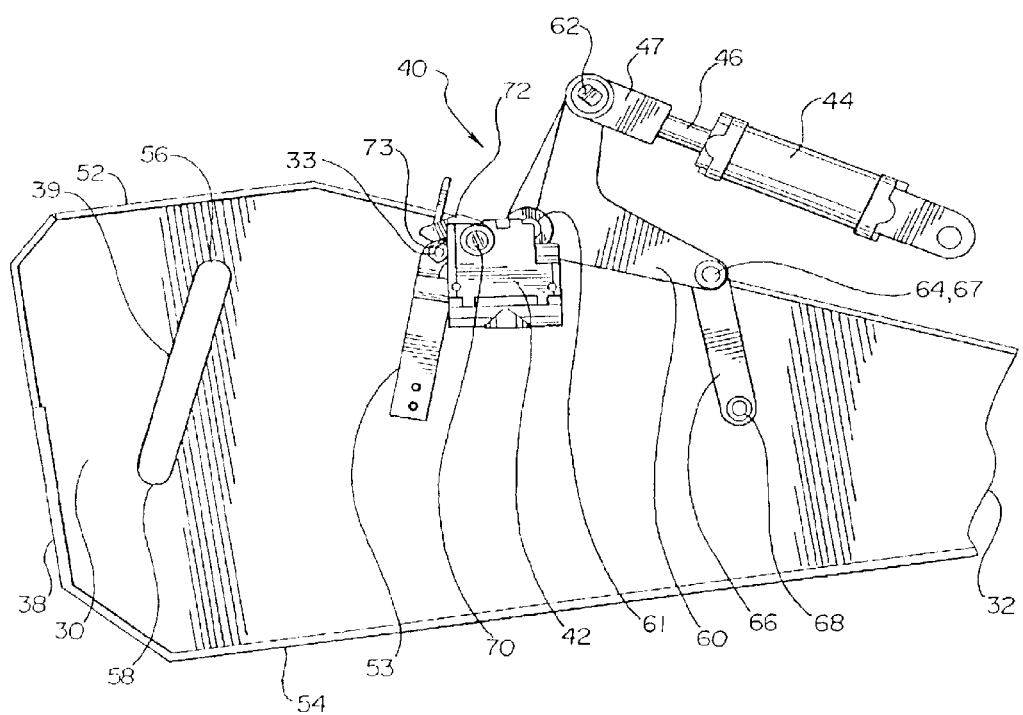
FIG. 5 is a side view of the present invention in the second configuration with some parts cut away.
Figure 6:
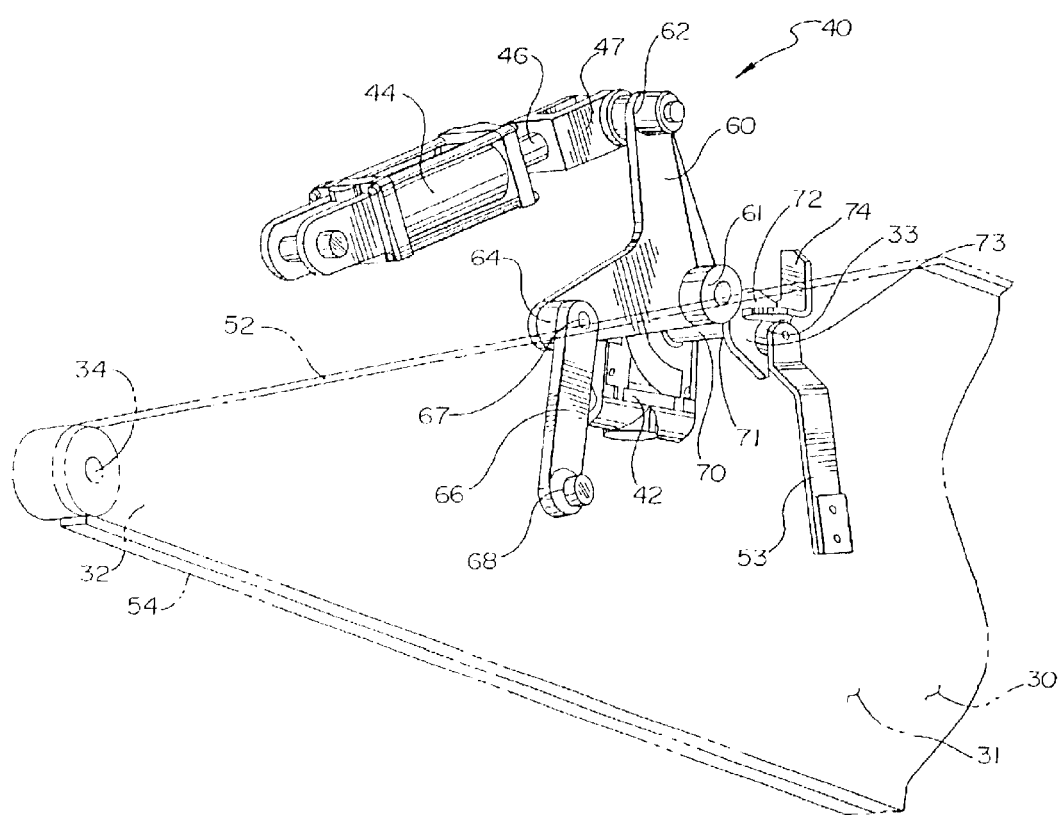
FIG. 6 is a perspective view of the present invention with some parts cut away.

FIGS. 1 and 2 illustrate one embodiment of the present invention. A brush cutter attachment 10 is shown attached to the front of a cab 50. The brush cutter attachment 10 may be used to cut brush such as plants, grass, weeds, branches and the like. The cab 50 provides means for an operator to steer and advance the brush cutter attachment 10 over a surface to be cleared by the attachment 10.

The brush cutter attachment 10 is shown as having a housing 20 and a side panel 30 moveably secured to the housing 20 in a pivotal fashion. A biasing assembly 40 extends from the housing 20 to the side panel 30 urging the side panel 30 downwardly with respect to the housing 20.

The attachment 10 is operated by a motor. A shut-off valve 42 is mounted to the housing 20 and is activated to shut off the motor when the side panel 30 extends downwardly a predetermined distance with respect to the housing 20. As shown in FIG. 1, the side panel 30 is biased to contact the cutting surface as the housing 20 travels over the surface. In this illustration, operation of the shut-off 42 valve will not occur and the motor will continue to operate.

As shown in FIG. 2, the housing 20 may be movable a predetermined distance above the surface to be cleared. This will render the side panel 30 extending downwardly a predetermined distance relative to the housing 20, thus initiating the shut-off valve 42 and shutting off the motor.

The housing 20 has a pair of sidewalls 22, a front wall 24, a rear wall 26, and a cover 28, for housing a cutting blade. The cutting blade rotates about a shaft extending through the cover 28 toward the cutting surface. The blade rotates, it is intended, substantially parallel to the cutting surface at a predetermined height above that surface. The cutting blade is rotated by the motor. The motor is mounted on a top portion of the housing cover 28, within a motor casing.

The side panel 30 is moveably secured to the housing 20. The side panel 20 is biased downwardly with respect to the housing 20 for preventing debris from projecting from beneath the housing 20 and possibly causing injury to the operator or to a bystander. The side panel may 30 extend along the entire fore-and-aft length of the brush cutter 10.

The side panel 30 is, at a front location 32, pivotally connected to the housing 20. The front portion 32 has an aperture 34 for pivotally securing the side panel 30 to the housing 20. A locking bolt 36 may be extended through the aperture 34 to maintain the side panel 30 adjacent the housing 20. A neck 37 of the bolt 36 may extend through the aperture 34 and into a securing portion of the housing 20. The head of the bolt 36 may extend to an outer surface 31 of the side panel 30 for maintaining the side panel 30 adjacent to the housing 20.

The side panel 30 has a back portion 38 that pivots about the aperture 34. The back portion 38 has an arcuate slot 39 for receiving a guide member 35. The guide member 35 extends from the housing 20 and through the slot 39. The guide member 35 may have a head that extends through to an outer side 31 of the side panel 30. The head portion may be wider than the slot 39 to maintain the side panel 30 adjacent the housing 20. The slot 39 may have a radius of curvature for allowing the side panel 30 to pivot. The side panel 30 is able to pivot about the locking bolt 36 until the guide member 35 contacts an upper limit or lower limit of the slot 39.

The panel 30 has a top side 52 and a bottom side 54. The top side 52 may converge toward the bottom side 54 as it progresses toward the front 32 of the side panel 30. A substantial length of the bottom side 54 of the side panel 30 is linear for contacting the cutting surface.

In operation, as the brush cutter 10 is advanced over a surface, the side panel can pivot about the locking bolt 36. For example, if the housing 20 is substantially close to the cutting surface, the side panel 30 will be centered such that the guide member 35 is spaced from the upper limit 56 and lower limit 58 of the slot 39. If the housing 20 becomes raised above the cutting surface, the side panel 30 moves downwardly toward the cutting surface such that the guide member 35 becomes located at the upper limit 56 of the slot 39 and the bottom side 54 of the side panel 20 extends below a lower portion 21 of the housing 20.

The housing 20 has a cover panel 28 and a pair of sidewalls 22 for housing the cutting blade. The housing 20 has a front portion 25 that is angled upwardly with respect to the lower portion 21 of the housing 20. The front portion 25 allows for brush to be received within the housing 20 in order to be cut by the blades. The housing 20 has a rear portion 27 for connection to the cab 50. By connecting to the cab 50, the housing 20 may be directed over the cutting surface by the operator of the cab 50. A motor used for rotating the blade may also be connected to, and operable from, the cab 50. The motor provides a torque force to a blade shaft for rotating the blade.

FIGS. 3 through 6 illustrate a biasing mechanism 40 mounted for biasing the side panel 30 downwardly with respect to the housing 20. A shut-off valve 42 is also secured to the housing 20. The shut-off valve 42 works in tandem with the biasing mechanism 40 such that, when the side panel 30 is fully extended downwardly, the shut-off valve 42 will be switched so as to shut-off the motor to the rotatable blade, thus stopping the blade from being rotated and preventing possible injury to the operator.

Turning now to FIGS. 3–6, the biasing mechanism 40 includes a cylinder 44 and piston 46 assembly secured to the top portion 28 of the housing 20. The cylinder 44 and piston 46 assembly may be hydraulic, as shown. The piston 46 has a working end 47 pivotally connected to a first end 62 of a bell crank 60. A second end 64 of the bell crank 60 is pivotally attached to the side panel 30 via a connecting arm 66. The connecting arm 66 has a first end 67 pivotally connected to the second end 64 of the bell crank 60 and a second end 68 pivotally connected to the side panel 30. The bell crank 60 has an elbow 61 that is pivotally secured to the housing 20. As shown, the elbow 61 is pivotally connected to a mounting member 29 extending from the top portion 28 of the housing 20. The elbow 61 is positioned proximate the shut-off valve 42.

The shut-off valve 42 is secured to a motor casing 23 extending above a top portion 28 of the housing 20. The shut-off valve 42 has a rotatable shaft 70 extending in a direction toward the side panel 30. The shaft 70 has a first end 71 for receiving a pin 33 extending from the side panel 30. A yoke 72 is positioned at the first end 71 for engaging the pin 33 such that, as the pin 33 is received within the yoke 72, the shaft 70 will be rotated so as to initiate action by the shut-off valve 42 and shut-off the motor by shutting off the hydraulics to the motor.

The shaft 70 has a lift limit switch 74 that will rotate with the shaft 70 such that, when the shaft 70 is rotated, the limit switch 74 will extend upwardly.

The shut-off valve 42 may have a timer such that the valve 42 may be rotated for a predetermined period of time before the shut-off valve 42 initiates shutting down the motor. Thus, if the yoke 72 is removed from a position receiving the pin 33 prior to reaching the predetermined period of time, the motor will not be shut off.

The side panel 30 has a bracket 53 for mounting the pin 33 to the side panel 30. The pin 33 extends inwardly from the side panel 30 for engaging the first end 71 of the shaft 70. More specifically, the pin 33 extends from an inner portion of the side panel 30 for engaging the receiving portion 73 of the yoke 72. The bracket 53 may be adjustable such that the height at which the housing 20 must be raised with respect to the side panel 30 at which the shut-off valve 42 will be engaged, may be adjusted.

In operation, the motor will rotate the blade and the operator may steer the cab 50 over a cutting surface. As the brush cutter 10 travels over the cutting surface, the piston 46 is biased in the direction of the cylinder 44, thus biasing the side panel 30 downwardly with respect to the housing 20 and towards the cutting surface. The elbow 61 will pivot so as to distend the connecting arm 66 downwardly toward the cutting surface. The side panel 30 is able to pivot about the front portion 32 locking bolt 36 and move upwardly and downwardly with respect to the housing 20 as the brush cutter 10 moves over ground.

When the housing 20 is lifted a predetermined distance above the cutting surface, the side panel 30 will extend downwardly such that the engaging pin 33 will engage the yoke 72 at the first end 71 of the shaft 70 of the shut-off valve 42. The engaged yoke 72 will cause the shaft 70 to rotate, initiating the shut-off valve 42 to shut-off the hydraulics to the motor, and thus shutting down the blade from rotating. The lift limit switch 74 extends upwardly from the housing.

The operator may restart the motor by returning the brush cutter 10 to a height above the cutting surface that does not initiate the shut-off valve 42.

It will be understood that this disclosure, in many respects, is only illustrative. Changes may be made in details, particularly in matters of shape, size, material, and arrangement of parts without exceeding the scope of the invention. Accordingly, the scope of the invention is as defined in the language of the appended claims.

What is claimed is:

1. A brush cutter apparatus comprising:
   a moveable side panel for preventing debris from being projected from a side of a brush cutter housing,
   a biasing assembly having a first end connected to said housing and a second end pivotally connected to said moveable side panel for biasing said moveable side panel toward a surface over which said brush cutter apparatus travels,
   said moveable side panel being able to communicate with said housing for shutting off said brush cutter when said housing is lifted a predetermined distance from the surface over which said brush cutter apparatus travels.

2. The apparatus according to claim 1 further comprising safety apparatus wherein said first end of said biasing assembly has a piston pivotally attached to a connection arm.

3. The apparatus according to claim 1 wherein said housing has a shut-off valve actuatable by said side panel.

4. The apparatus according to claim 3 wherein said side panel has a pin for actuating said shut-off valve.

5. The apparatus according to claim 4 wherein said shut-off valve is connected to a motor, for shutting off said motor.

6. The apparatus according to claim 5 wherein said shut-off valve has a rotatable shaft rotatable to activate said shut-off valve to shut off said motor.

7. The apparatus according to claim 6 wherein said shaft has a yoke for receiving said pin.

8. The apparatus according to claim 7 wherein said shut-off valve has a limiting switch that rotates with said shaft.

9. The apparatus according to claim 8 wherein said shut-off valve has a timer for allowing said side panel to return to a non-activating orientation.

10. The apparatus according to claim 9 wherein said connecting arm of said biasing mechanism has an elbow pivotally secured to said housing.

11. The apparatus according to claim 10 wherein said pin is adjustable on said side panel.

12. The apparatus according to claim 11 wherein said side panel has a front portion pivotally secured to said housing.

13. The apparatus according to claim 12 wherein said side panel has a rear portion having a slot for allowing said side panel to pivot about a guide with respect to said housing.

14. The apparatus according to claim 13 wherein said motor uses hydraulics.

15. A brush cutter attachment comprising:

a housing for housing a rotatable cutting blade, said housing having a shut-off valve attached thereon; and a side panel, moveably connected to said housing wherein said side panel has a limiting pin for engaging said shut-off valve when said side panel moves a predetermined distance with respect to said housing; and a biasing assembly secured to said housing for biasing said side panel with respect to said housing, said biasing assembly being pivotally connected to a first end of a connecting arm, said connecting arm having a second end pivotally connected to said side panel.

* * * * *